United States Patent
Baldauf et al.

(10) Patent No.: US 7,318,376 B1
(45) Date of Patent: Jan. 15, 2008

(54) KNOTTER BLOWER FOR AGRICULTURAL BALERS

(75) Inventors: Jeffery A. Baldauf, Hesston, KS (US); Nathan K. Ensminger, South Hutchinson, KS (US); Erik L. Barnes, Peabody, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 11/531,214

(22) Filed: Sep. 12, 2006

(51) Int. Cl.
*B65B 13/26* (2006.01)
*A01D 59/04* (2006.01)

(52) U.S. Cl. .................. 100/33 R; 100/31; 100/102; 56/343; 56/433

(58) Field of Classification Search ............... 100/29, 100/32, 33 R, 31, 102; 56/343, 433, 435, 56/439, 441, 442, 444, 445
See application file for complete search history.

(56) References Cited

U.S. PATENT DOCUMENTS

| 3,020,829 A | 2/1962 | Pearson |
| 3,789,752 A | 2/1974 | Witz |
| 4,805,391 A | 2/1989 | De Zylva |
| 4,951,452 A * | 8/1990 | Lundahl et al. ............. 56/341 |
| 6,394,245 B2 * | 5/2002 | Kendrick et al. ............ 192/27 |

OTHER PUBLICATIONS

Page from Eucania International Inc. website at http://www.eucania.com/lrge.htm, printed Mar. 2, 2004.
Eucania International Inc. drawing No. 5115-8 titled "8" Blower Housing dated Dec. 20, 2000.
Cover page and pp. B-2, B-3 from AGCO Operator's Manual for Gleaner Model R55-Combine, No. 71406405 A Rev.
Cover page and pp. 130 (3 pages from AGCO Gleaner Parts Catalog for R55 Combine (Form No. 79021867D, dated Jun. 2005).

* cited by examiner

*Primary Examiner*—Jimmy T. Nguyen
(74) *Attorney, Agent, or Firm*—Hovey Williams LLP

(57) ABSTRACT

A crop baler having a bank of knotters employs a cross flow blower to produce a full width stream of air transversely across the line of knotters to keep them free of debris and residue. The blower is hingedly mounted on an enclosure over the knotters for selective movement between a lowered operating position and a raised access position.

14 Claims, 7 Drawing Sheets

KNOTTER BLOWER FOR AGRICULTURAL BALERS

TECHNICAL FIELD

The present invention relates to crop balers and, more particularly, to crop balers having blowers that keep trash and crop residue from interfering with the intricate knotter mechanisms of such machines.

BRIEF DESCRIPTION OF THE DRAWINGS

FIG. 8 is an enlarged, fragmentary cross sectional view of latch mechanism for retaining the blower in its lowered, operating position, the latch mechanism being illustrated in a locked condition; and FIG. 9 is a fragmentary cross sectional view of the latch mechanism similar to FIG. 8 but showing the mechanism in its unlocked condition.

DETAILED DESCRIPTION OF A PREFERRED EMBODIMENT

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
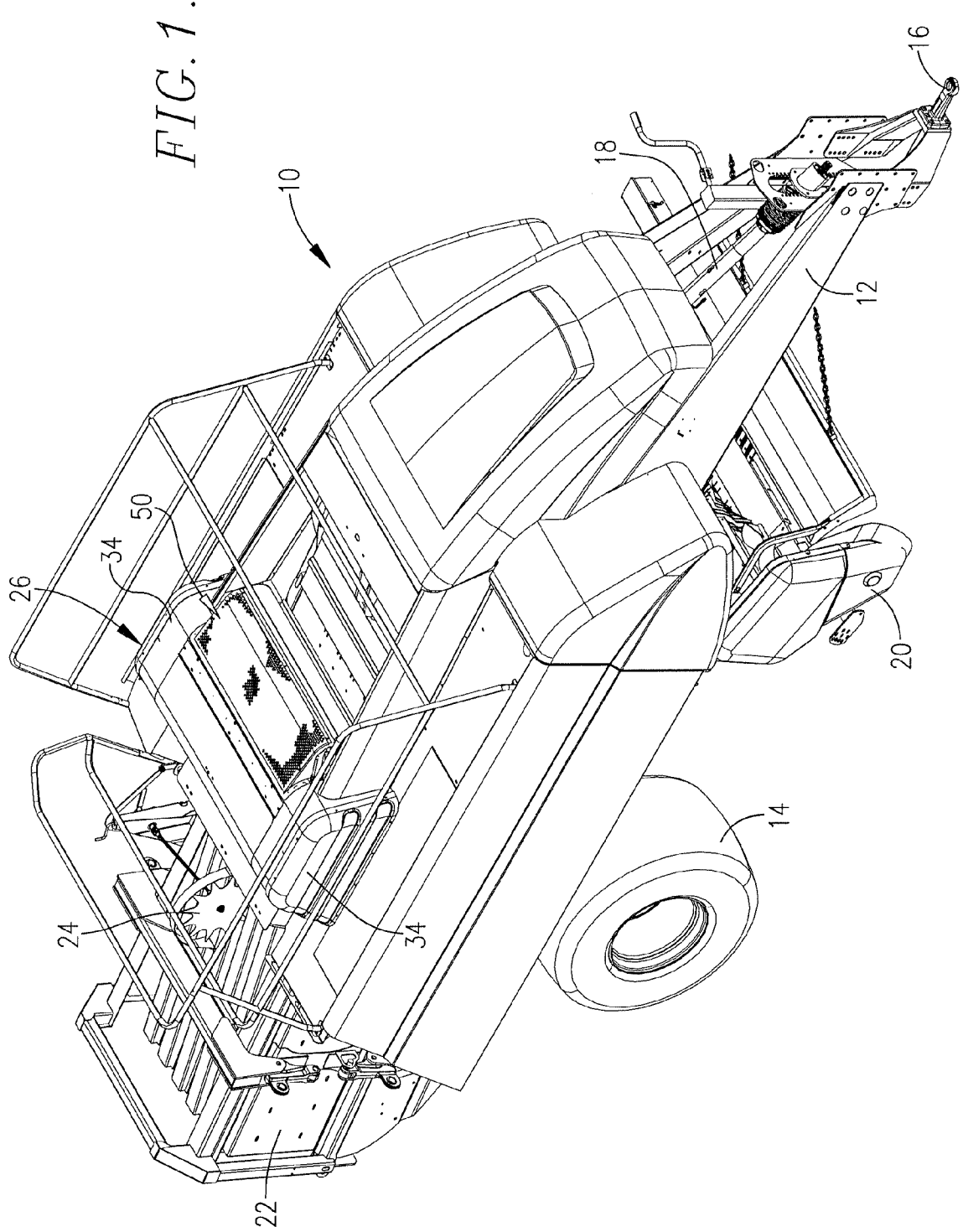
FIG. 1 is a right front perspective view of a large rectangular baler equipped with a knotter blower in accordance with the principles of the present invention.
Figure 2:
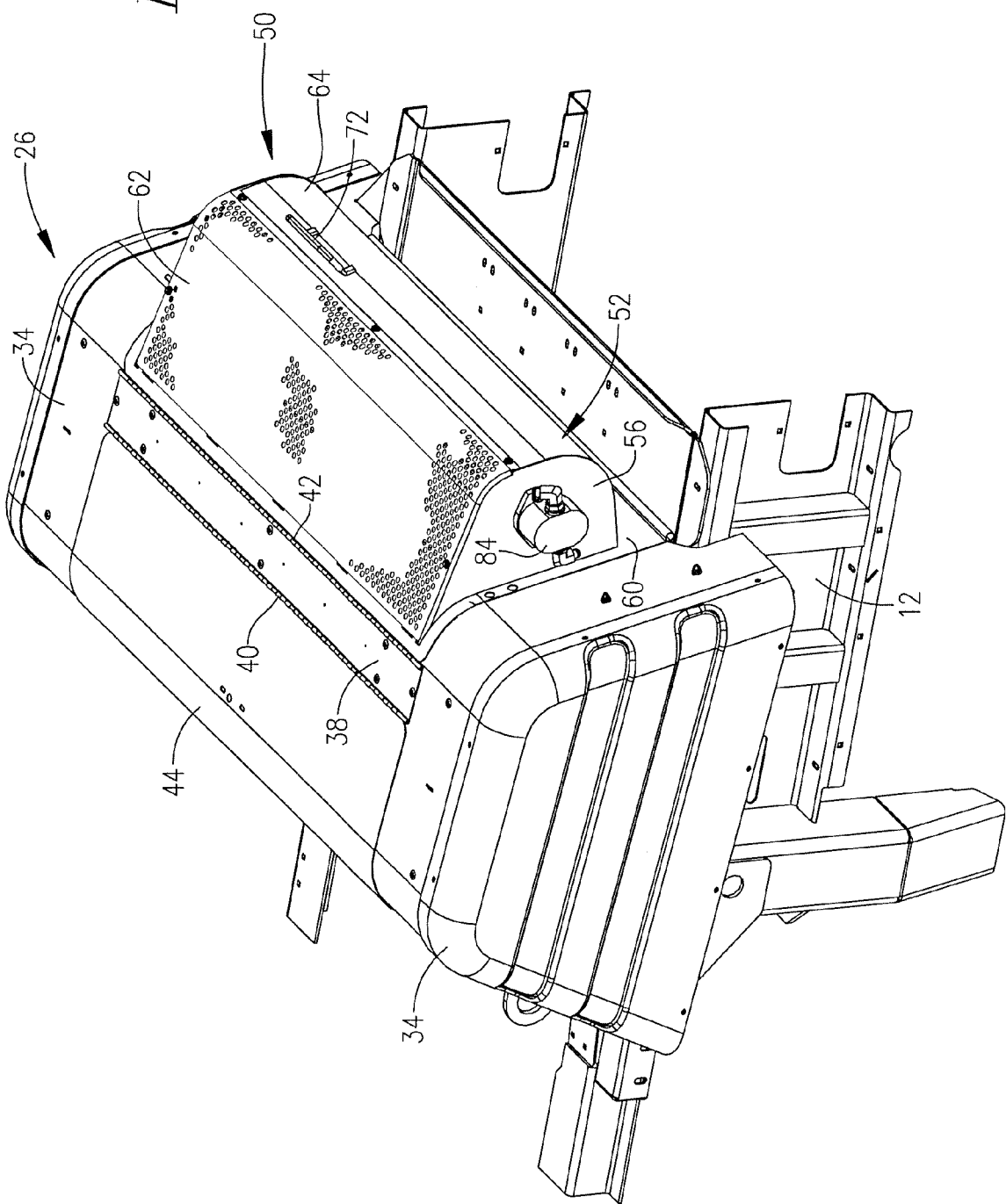
FIG. 2 is an enlarged right front perspective view of the knotter enclosure and blower as well as certain frame portions of the baler.

The baler 10 in FIG. 1 is illustrated by way of example as a large rectangular baler. Examples of this type of machine may be found in U.S. Pat. Nos. 4,106,268; 6,394,245; and 6,679,042. However, it is to be appreciated that the principles of the present invention are not limited to large rectangular balers and are applicable to any crop baler employing a line or bank of knotters used for binding bales produced by the machine. In order to provide an exemplary description of the construction and operation of a large rectangular baler and a knotter mechanism, U.S. Pat. Nos. 4,106,268; 6,394,245; and 6,679,042 are hereby incorporated by reference into the present specification.

Figure 3:
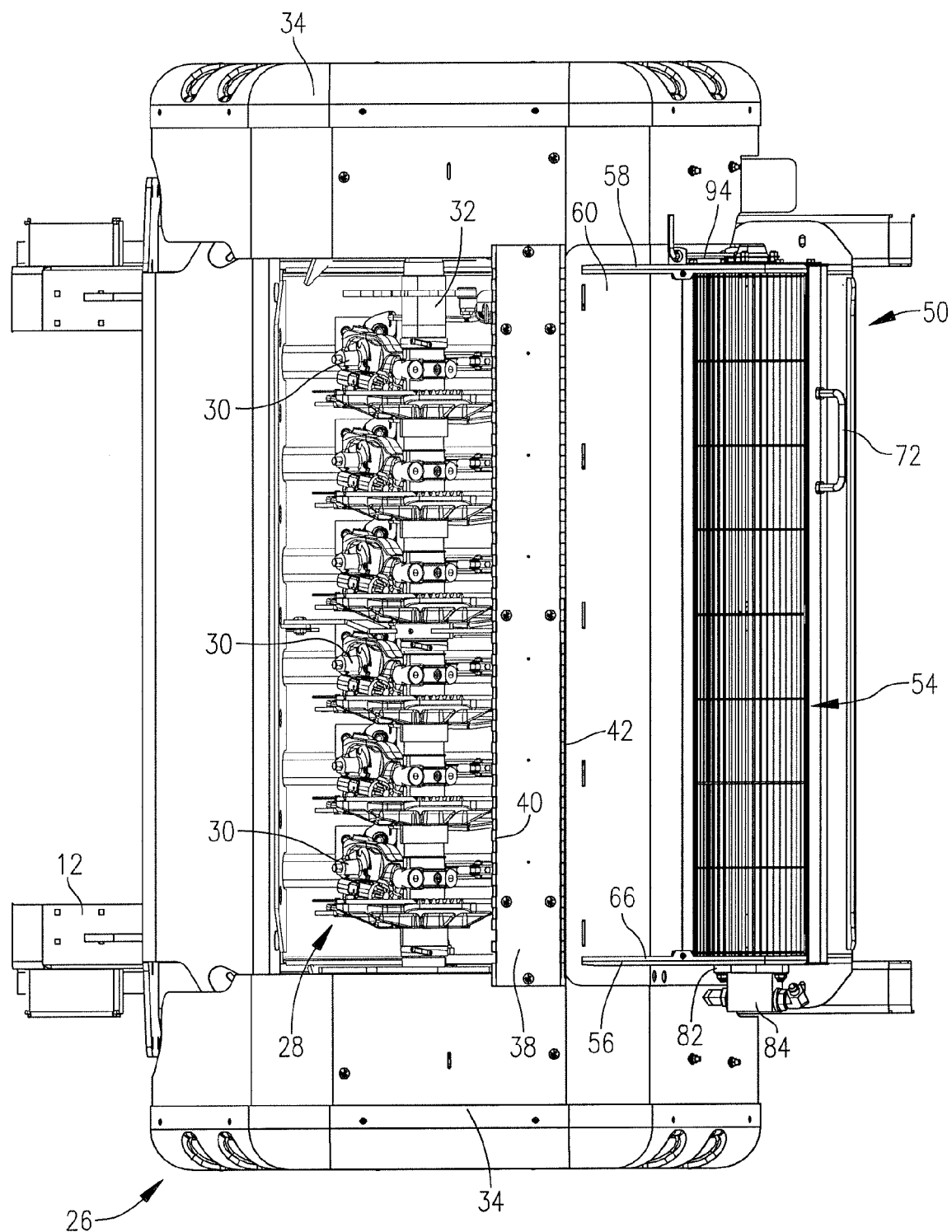
FIG. 3 is a top plan view of the knotter enclosure and blower of FIG. 2 with the top panel of the enclosure and top wall of the blower removed to reveal details of construction.
Figure 4:
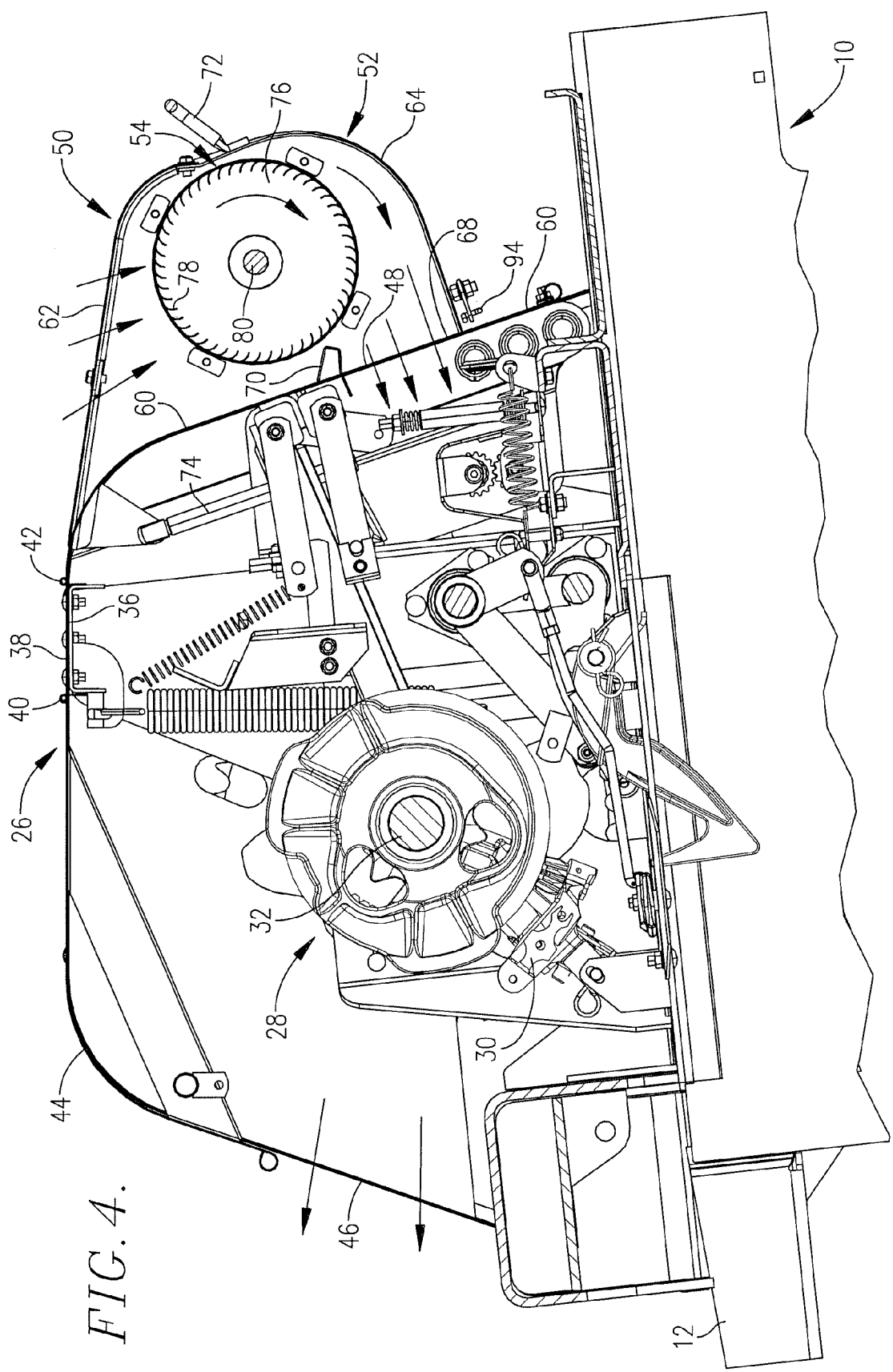
FIG. 4 is an enlarged, fragmentary vertical cross sectional view through the knotter mechanism, enclosure and blower.
Figure 5:
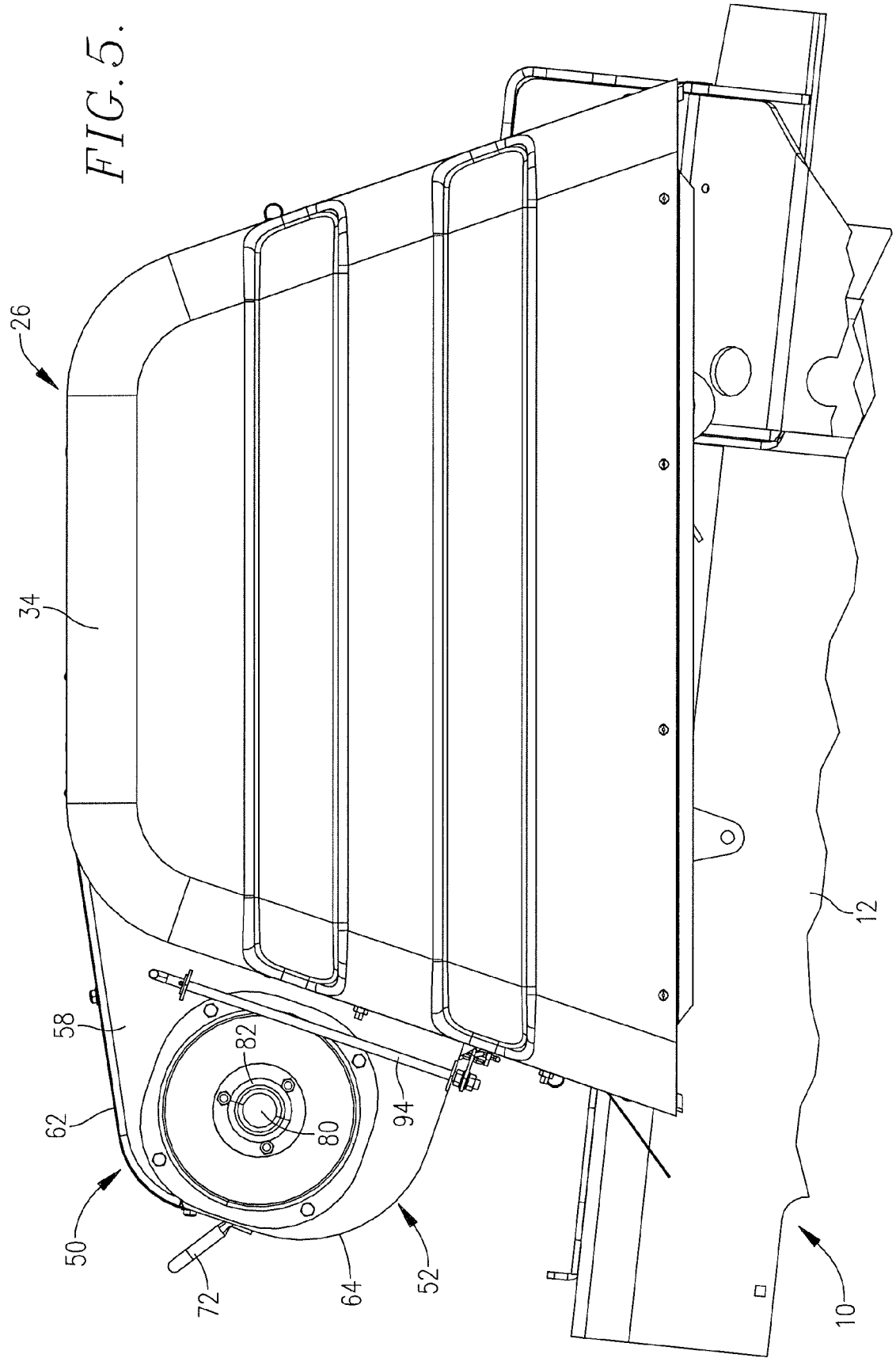
FIG. 5 is a fragmentary left side elevational view of the knotter enclosure and blower.
Figure 6:
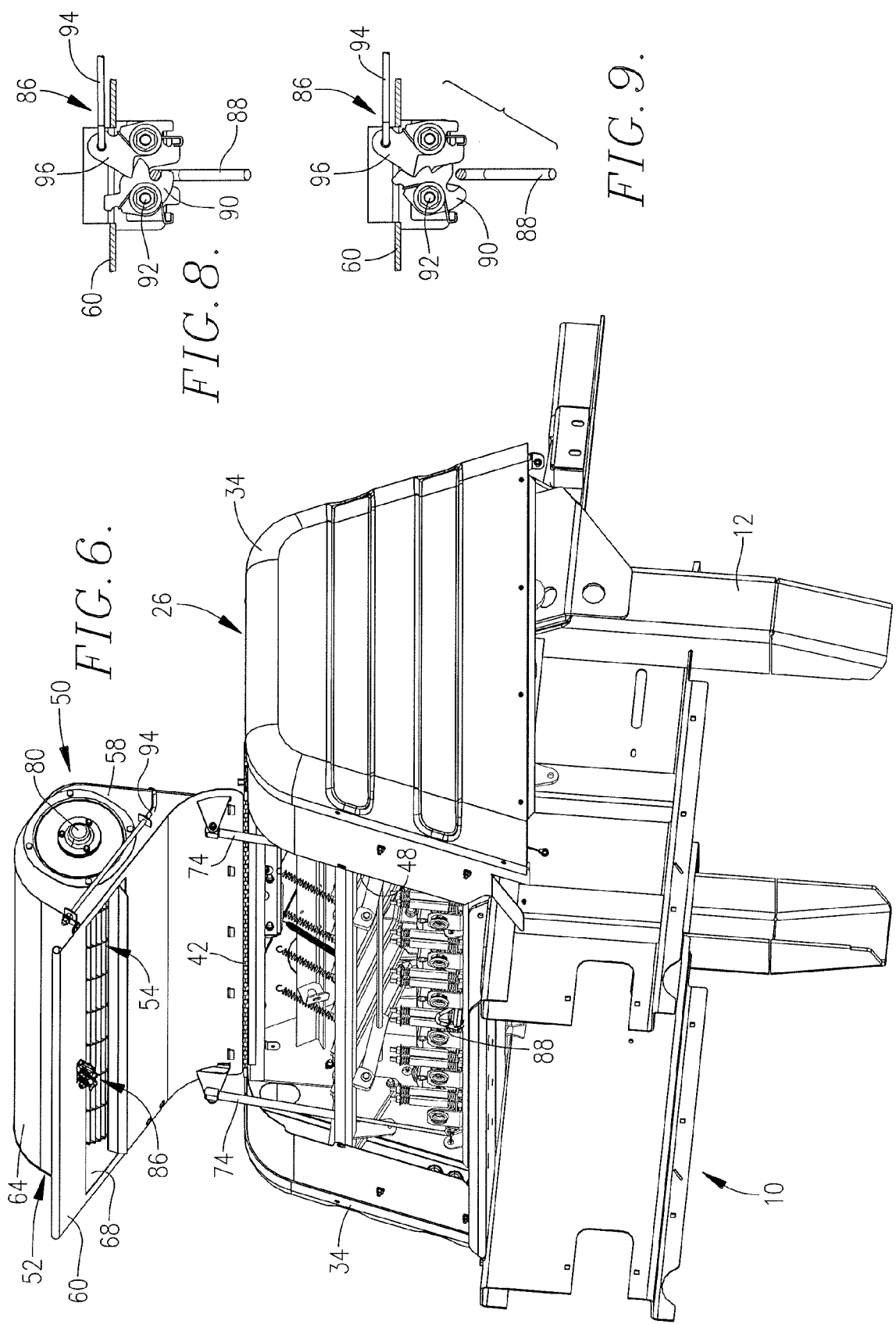
FIG. 6 is a left front perspective view of the knotter enclosure and adjacent baler frame with the blower in a raised access position.
Figure 7:
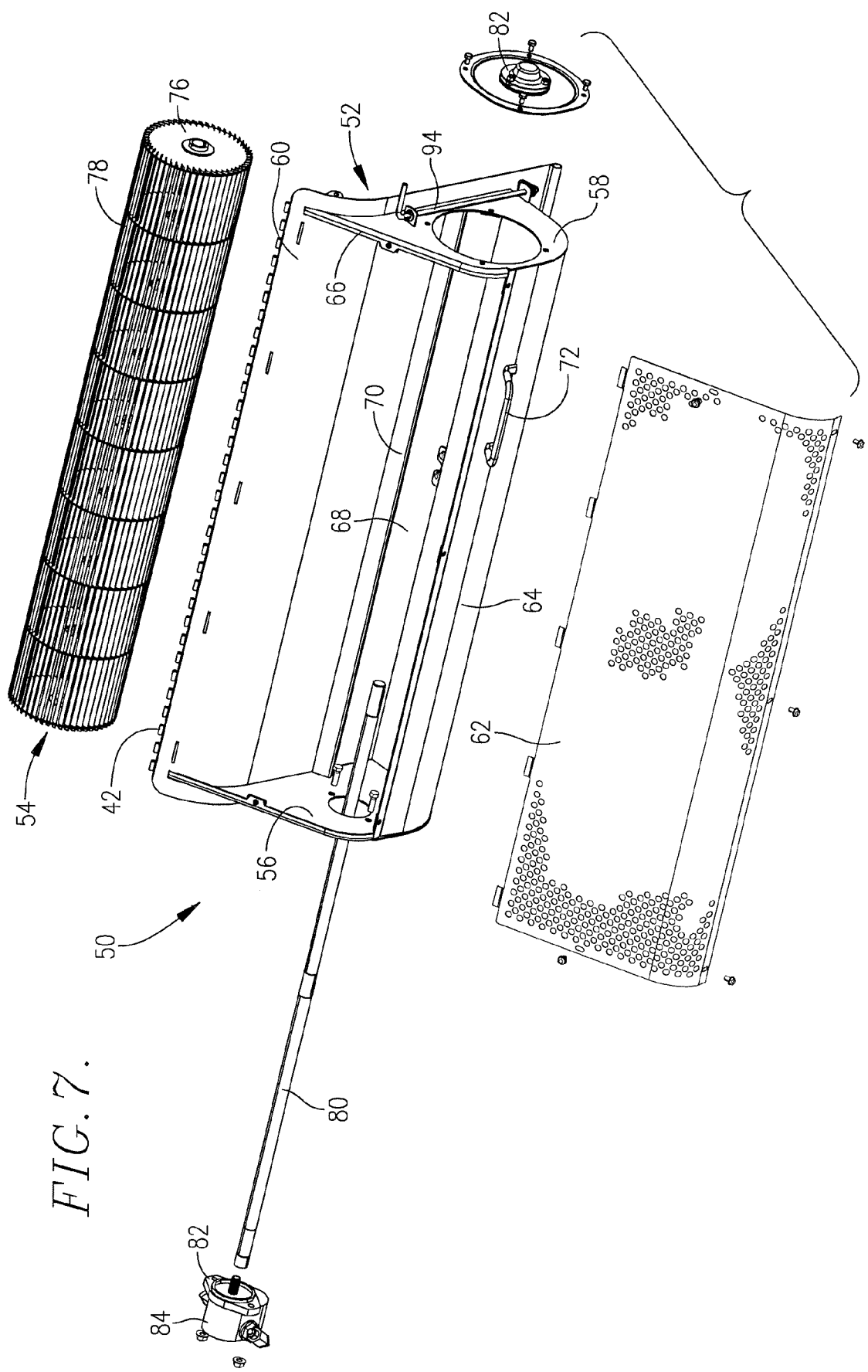
FIG. 7 is an exploded perspective view of the blower illustrating the component parts thereof.

Baler 10 broadly includes a frame 12 supported by ground wheels 14. The front end of frame 12 includes a hitch 16 for connecting baler 10 to a towing vehicle (not shown). An input drive shaft 18 at the front of baler 10 is adapted to be mechanically coupled with the power takeoff shaft of the towing vehicle to supply power to the moving parts of baler 10. A pickup 20 near the front of the machine functions to lift windrowed crop materials off the ground as baler 10 is advanced, whereupon the picked up materials are formed into bales internally of the machine and ejected therefrom out the rear of the machine through an open-ended bale case 22. A bale length sensor wheel 24 engages the bale as it progresses rearwardly through the baler, and when an appropriate length of bale has been formed, the sensor 24, in collaboration with other mechanism, triggers knotter mechanism on top of baler 10 and under an enclosure 26 to bind the bale with several strands of twine. The knotter mechanism is denoted broadly by the numeral 28 and is shown in FIGS. 3, 4 and 6.

Among other things, the knotter mechanism 28 includes a line or bank of individual knotters 30 lined up along a common transverse axis across the width of baler 10, such axis being presented in part by a transverse operating shaft 32. In the illustrated embodiment, a total of six knotters 30 are utilized, although this number could obviously vary depending upon a number of factors.

Enclosure 26 is secured to the frame 12 of baler 10 and generally comprises an upright hollow structure having a pair of upstanding, opposite end caps 34 of generally truncated triangular configuration. An inverted, generally U-shaped channel 36 (FIG. 4) extends transversely of baler 10 across the top of enclosure 26 to interconnect the end caps 34. An elongated hinge plate 38 overlies channel 36 along the length thereof and includes a pair of hinges 40 and 42 along opposite longitudinal edges thereof. Hinge 40 serves to hingedly secure a formed metal panel 44 or cover to hinge plate 38 for closing off the top rear portion of enclosure 26 yet allowing access to knotter mechanism 28 when the need arises. The rear 46 of enclosure 26 below the rearmost and lowermost terminal edge of cover 44 is open for the purpose of exhausting air and debris from under enclosure 26 as will hereinafter become apparent. The opposite, front side of enclosure 26 is open between end caps 34 and under hinge 42 so as to define an opening broadly denoted by the numeral 48 in FIG. 4.

A blower broadly denoted by the numeral 50 is mounted on and supported by enclosure 26 in a generally overlying relationship to opening 48. Blower 50 is attached to enclosure 26 by hinge 42 for selective movement between a lowered operating position shown in most of the figures and a raised access position as shown in FIG. 6. When in its lowered, operating position, blower 50 is disposed for supplying a strong stream of air against the bank of knotters 30 so as to prevent the accumulation of crop residue and dust particles that might otherwise interfere with operation of the mechanism.

Blower 50 is a cross-flow type blower having as its primary components a housing 52 and an elongated, generally cylindrical fan wheel 54 rotatably supported within housing 52. Housing 54 includes a pair of opposite end walls 56 and 58 that support the fan wheel 54. Additionally, housing 52 includes a back wall 60 to which end walls 56, 58 are secured, a foraminous top wall 62 spanning the upper margins of end walls 56, 58, and a bottom wall 64 beginning at the lower front termination of top wall 62 and looped around and under fan wheel 54 in spanning relationship to end walls 56, 58. A rectangular air inlet 66 is defined between the upper extremities of end walls 56, 58 and the upper extremity of bottom wall 64 below foraminous top wall 62. Access to inlet 66 by ambient air is provided by the holes within top wall 62.

Housing 52 also includes an elongated air outlet 68 that is located adjacent the lower rear extremity of housing 52. Air outlet 68 is defined between lower rear extremities of end walls 56, 58, the lower rear extremity of bottom wall 64, and the lower rear extremity of back wall 60. The top extremity of outlet 64 is defined by a longitudinally extending formed rib 70 on back wall 60 that projects forwardly into the chamber defined within housing 50 wherein fan wheel 54 is located. Rib 70 projects inwardly into fairly close proximity with the outer periphery of fan wheel 54 so as to assist in guiding the airflow created by fan wheel 54 out through outlet 68 instead of circumferentially around fan wheel 54 during rotation thereof.

Back wall 60 of housing 52 is attached along its upper extremity to hinge plate 38 by hinge 42. Back wall 60 is slightly wider than opening 48 so that lateral margins of back wall 60 overlap and lie against front surfaces of end caps 34 when blower is in its lowered operating position. A handle 72 projects outwardly and upwardly from bottom wall 64 adjacent the lower extremity of top wall 62 to provide a means for manually gripping blower 50 and raising and lowering the same between its two extreme positions. A pair of compressible gas telescoping struts 74 are connected between back wall 60 and frame 12 of baler 10 in such a geometric relationship as to permit struts 74 to yieldably retain blower 50 in its raised position, yet allow blower 50 to remain closed after being placed in its lowered position.

The fan wheel 54 is a tangential or cross-flow type wheel having a series of axially aligned, circular discs 76 that support a circumferentially extending series of elongated, axially extending blades 78 about their periphery. Blades 78 are slightly transversely curved and are inclined slightly forwardly with respect to the direction of rotation of fan wheel 54, which is clockwise viewing FIG. 4. A central drive shaft 80 passes through the centers of support discs 76 and is affixed at least to the endmost discs 76. One source of tangential fan wheels suitable for use in blowers in accordance with the present invention is Eucania International, Inc. of Dorval, Quebec, Canada.

Fan wheel 54 is slightly shorter than housing 52, but shaft 80 is slightly longer than housing 52 such that it projects somewhat beyond opposite end walls 56, 58. Bearings 82 supported on opposite end walls 56, 58 journal shaft 80 so as to rotatably support fan wheel 54. A hydraulic motor 84 associated with bearing 82 on end wall 56 is drivingly coupled with shaft 80 to supply driving power to fan wheel 54. Hydraulic motor 84 is coupled with a source of pressurized fluid (not shown) which may or may not include a reservoir and pump onboard the baler 10. Motor 84 could also be electric, but a hydraulic motor is preferred.

Blower 50 is provided with a releasable latch 86 for locking blower 50 down in the operating position. Latch 86 cooperates with a rigid loop 88 (FIG. 6) at the lower front margin of enclosure 26 for keeping blower 50 locked. Details of construction of latch 86 are illustrated in FIGS. 8 and 9 wherein it may be seen that latch 86 includes a catch 90 that is pivotal about a pin 92 between a locked position as shown in FIG. 8 in which catch 90 is lockingly engaged with loop 88 and an unlocked position as shown in FIG. 9 wherein catch 90 is released from loop 88. A manually operable linkage 94 is secured to the outside of housing 52 and is operably coupled with a pivotal cam 96 of latch 86 for manipulating catch 90 between its locked and unlocked positions.

It will be appreciated from the foregoing that when blower 50 is in its lowered operating position the outlet 68 of housing 50 is disposed in close proximity to and registration with opening 48 of enclosure 26. Thus, when fan wheel 54 is driven by hydraulic motor 84 in a clockwise direction viewing FIG. 4, air is drawn into housing 50 through inlet 66 and is propelled out of housing 50 through outlet 68 all along the length of outlet 68. This airstream has a width corresponding to the length of the bank of knotters 30 such that the stream created by blower 50 enters enclosure 26 and impacts knotters 30 and the rest of knotter mechanism 28 essentially across the entire width of enclosure 26, exiting through the open rear 46 of enclosure 26 and carrying with it entrained pieces of crop residue and debris. By keeping hydraulic motor 84 in constant operation, the knotters 30 are constantly subjected to the airstream from blower 50, denying residue and debris the opportunity to collect on the knotter mechanism.

In the event that knotter mechanism 28 is in need of service, latch 86 of blower 50 may be quickly and easily released by manipulating linkage 94, where upon handle 72 may be grasped and blower 50 raised to its access position of FIG. 6. This uncovers opening 48 of enclosure 26 to expose the front portion of knotter mechanism 28 and allow access thereto. The rear cover 44 of enclosure 26 can also be raised about hinge 40 for direct access to knotters 30 if desired.

A knotter blower in accordance with the present invention provides a number of significant benefits. For one thing, utilizing a tangential or cross-flow blower that issues a wide, uniform stream of air along the full length of the knotter stack or bank is more effective than prior blowers in keeping deleterious debris and residue from interfering with proper operation of the knotter mechanism. Furthermore, the tangential blower is capable of moving a larger volume of air at lower power than many conventional arrangements. In addition, the large inlet area of the blower is less likely to become clogged than the filters commonly used with many conventional systems. Still further, the blower is of simple, compact design that enables the entire blower to be easily moved to an access position for service, and also contributes to an aesthetically pleasing "designed-in" look that coordinates better with other design features of the baler.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In combination with a crop baler having an elongated bank of knotters, a cross-flow blower comprising:

a housing having an elongated air outlet extending along the length of the bank of knotters and an air inlet; and an elongated, generally cylindrical fan wheel supported in said housing for rotation about an axis extending generally parallel to the longitudinal axis of said outlet for drawing air into the housing through said inlet and discharging a stream through said outlet against the bank of knotters.

2. The combination of claim 1, said blower being mounted for selective movement between a lowered operating position and a raised access position.

3. The combination of claim 2, said selective movement of the blower being pivotal movement.

4. The combination of claim 2,
further comprising mechanism for yieldably holding the blower in said raised position.

5. The combination of claim 4,
said mechanism comprising at least one compressible gas telescoping strut.

6. The combination of claim 1,
further comprising an enclosure over the bank of knotters, said enclosure having an opening,
said blower being pivotally mounted on said enclosure for selective movement between a lowered operating position in which the outlet of the housing is in registration with said opening and a raised access position in which the outlet is spaced away from the opening.

7. The combination of claim 6,
further comprising a motor mounted on the housing and operably coupled with said fan wheel for driving the same.

8. The combination of claim 7,
said motor comprising a hydraulic motor.

9. The combination of claim 7,
said motor comprising an electric motor.

10. The combination of claim 1,
said housing having a pair of opposite end walls rotatably supporting said fan wheel and a top wall, a bottom wall, and a back wall extending between said end walls,
said inlet being associated with said top wall and said outlet being associated with said back wall.

11. The combination of claim 10,
said top wall being foraminous to allow flow through said inlet.

12. The combination of claim 10,
further comprising an enclosure over the bank of knotters,
said back wall being hingedly connected to said enclosure adjacent an upper extremity of the back wall to render the blower selectively movable between a lowered operating position and a raised access position.

13. The combination of claim 12,
said enclosure having an opening,
said outlet of the housing being in registration with said opening when the blower is in said lowered position and being spaced away from said opening when the blower is in said raised position.

14. The combination of claim 1,
said inlet and said outlet each being substantially the same length as said fan wheel.

* * * * *